US012195661B2

(12) United States Patent
Maruo et al.

(10) Patent No.: US 12,195,661 B2
(45) Date of Patent: Jan. 14, 2025

(54) LIQUID CRYSTAL POLYMER COMPOSITION, LIQUID CRYSTAL POLYMER MOLDED BODY, AND CAMERA MODULE

(71) Applicant: OTSUKA CHEMICAL CO., LTD., Osaka (JP)

(72) Inventors: Toshihiro Maruo, Tokushima (JP); Yuuki Takaishi, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 31 days.

(21) Appl. No.: 17/775,965

(22) PCT Filed: Dec. 3, 2020

(86) PCT No.: PCT/JP2020/045083
§ 371 (c)(1),
(2) Date: May 11, 2022

(87) PCT Pub. No.: WO2021/117607
PCT Pub. Date: Jun. 17, 2021

(65) Prior Publication Data
US 2022/0380675 A1    Dec. 1, 2022

(30) Foreign Application Priority Data
Dec. 11, 2019   (JP) .................................. 2019-223385

(51) Int. Cl.
G02F 1/1333   (2006.01)
C08J 5/04   (2006.01)
C08K 3/30   (2006.01)
C09K 19/38   (2006.01)

(52) U.S. Cl.
CPC ......... *C09K 19/3809* (2013.01); *C08J 5/0405* (2021.05); *C08K 3/30* (2013.01); *C08J 2327/18* (2013.01); *C08J 2367/00* (2013.01); *C08K 2003/3045* (2013.01)

(58) Field of Classification Search
CPC ............ C09K 19/3804; C09K 19/3809; C09K 2019/0444; C09K 2019/0448; G02F 1/1333; C08J 5/0405; C08J 2327/18; C08J 2367/00; C08K 3/30; C08K 2003/3045
See application file for complete search history.

(56) References Cited

U.S. PATENT DOCUMENTS

| | | | | |
|---|---|---|---|---|
| 4,218,362 A | * | 8/1980 | Honjo | C08L 27/12 |
| | | | | 427/195 |
| 4,491,553 A | * | 1/1985 | Yamada | C08J 9/0061 |
| | | | | 264/117 |
| 2012/0135228 A1 | | 5/2012 | Fukuhara et al. | |
| 2012/0194923 A1 | * | 8/2012 | Um | G02B 13/003 |
| | | | | 359/793 |
| 2013/0253118 A1 | | 9/2013 | Shiraishi et al. | |
| 2015/0291796 A1 | | 10/2015 | Kim | |
| 2017/0051147 A1 | | 2/2017 | Kim | |
| 2018/0086914 A1 | | 3/2018 | Kim | |
| 2019/0161612 A1 | | 5/2019 | Kim | |
| 2020/0247996 A1 | | 8/2020 | Kim | |
| 2020/0399470 A1 | | 12/2020 | Kim | |
| 2022/0098410 A1 | | 3/2022 | Kim | |
| 2022/0380675 A1 | * | 12/2022 | Maruo | C08K 7/04 |

FOREIGN PATENT DOCUMENTS

| | | | | | |
|---|---|---|---|---|---|
| CN | 102352259 A | * | 2/2012 | | C09K 19/38 |
| CN | 103168075 A | | 6/2013 | | |
| CN | 103923306 A | | 7/2014 | | |
| CN | 105462191 A | * | 4/2016 | | C08L 67/03 |
| CN | 105542408 A | * | 5/2016 | | C08L 67/03 |
| JP | 2000-273321 A | | 10/2000 | | |
| JP | 2005-239754 A | | 9/2005 | | |
| JP | 2006-083207 A | | 3/2006 | | |
| JP | 2012-87171 A | | 5/2012 | | |
| JP | 2012-116907 A | | 6/2012 | | |
| JP | 2017-513976 A | | 6/2017 | | |
| JP | 2018-104527 A | | 7/2018 | | |
| JP | 2018-525496 A | | 9/2018 | | |
| JP | 2019-14787 A | | 1/2019 | | |
| TW | 201224017 A | | 6/2012 | | |

OTHER PUBLICATIONS

Machine translation of CN 105542408 A (Year: 2024).*
Machine translation of CN 105462191 A (Year: 2024).*
Machine translation of CN 102352259 A (Year: 2024).*
Wang, Duoren, "Handbook for Production and Application of Modern Polymer Materials", p. 105; China Petrochemical Press; May 31, 2002; Cited in CN Search Result for Prior Art dated Jan. 20, 2023.
Wang, Chenghe, 'Tribology of Plastics—Theory and Practice of Friction, Wear and Lubrication of Plastics', p. 117, China Machine Press, Oct. 31, 1994; Cited in CN Search Result for Prior Art dated Jan. 20, 2023.
Office Action dated Jan. 20, 2023, issued in counterpart CN Application No. 202080085268.3. (10 pages).
International Search Report dated Feb. 22, 2021, issued in counterpart International Application No. PCT/JP2020/045083 (3 pages).
Notification of Transmittal of Translation of the International Preliminary Report on Patentability (Form PCT/IB/338) issued in counterpart International Application No. PCT/JP2020/045083 mailed Jun. 23, 2022, with Forms PCT/IB/373 and PCT/ISA/237. (5 pages).

* cited by examiner

*Primary Examiner* — Geraldina Visconti
(74) *Attorney, Agent, or Firm* — WHDA, LLP

(57) ABSTRACT

Provided is a liquid crystal polymer composition having a low coefficient of static friction and a low coefficient of kinetic friction both during sliding between a liquid crystal polymer molded body and a metallic material and during sliding between liquid crystal polymer molded bodies. The liquid crystal polymer composition contains a liquid crystal polymer (A), a polytetrafluoroethylene resin (B), and barium sulfate (C).

11 Claims, No Drawings

LIQUID CRYSTAL POLYMER COMPOSITION, LIQUID CRYSTAL POLYMER MOLDED BODY, AND CAMERA MODULE

TECHNICAL FIELD

The present invention relates to liquid crystal polymer compositions, liquid crystal polymer molded bodies using the liquid crystal polymer compositions, and camera modules using the liquid crystal polymer molded bodies.

BACKGROUND ART

Liquid crystal polymers are used in various components because they are excellent in mechanical strength, moldability, dimensional accuracy, chemical resistance, moisture resistance, electrical properties, and so on. Particularly, because the liquid crystal polymers have excellent thermal resistance and thin-wall moldability, use thereof in electronic components of precision equipment and the like, for example, in a camera module, are under consideration.

If any tiny particle of dirt, dust or like foreign matter adheres to a lens or an image sensor of a camera module, the camera module decreases its optical properties. For the purpose of preventing this decrease in optical properties, components for the camera module are generally ultrasonically cleaned prior to the assembly of them to remove tiny particles of dirt, dust or like foreign matter adhering to the surface of the components. However, because liquid crystal polymers have high crystalline orientation, it is known that a molded body made of liquid crystal polymer (a liquid crystal polymer melded body) is likely to cause surface delamination and ultrasonic cleaning of the molded body brings about a phenomenon of surface delamination and napping (fibrillation). Fibrillated portions of the liquid crystal polymer molded body are likely to produce small powder (particles), which decreases the productivity. In addition, because of ease of fibrillation, the liquid crystal polymer molded body has poor adhesiveness to other components of the camera module. To cope with these problems, Patent Literature 1 proposes a liquid crystal polymer composition containing inorganic particles having a Mohs hardness of 2.5 or more.

Meanwhile, many models of smartphones incorporate camera modules and, particularly, camera modules including an actuator mechanism, such as an autofocus (AF) mechanism or an optical image stabilizer (OIS), are widely prevalent. Because of the recent increasing number of cameras incorporated into a single smartphone, novel actuator mechanisms, such as integration of an AF mechanism and an OIS, enabling low-cost production of camera modules are under consideration.

CITATION LIST

Patent Literature

Patent Literature 1: JP-A-2017-513976

SUMMARY OF INVENTION

Technical Problem

In order to operate the actuator mechanisms smoothly, liquid crystal polymer molded bodies forming these mechanisms are required to have a low coefficient of friction. In addition, such a novel actuator mechanism as described above is required to have a low coefficient of static friction and a low coefficient of kinetic friction both during sliding between each liquid crystal polymer molded body and a metallic material and during sliding between liquid crystal polymer molded bodies. However, a molded body made of the liquid crystal polymer composition in Patent Literature 1 has a problem that the coefficients of friction do not become sufficiently low and, particularly, the coefficients of friction both during sliding between each liquid crystal polymer molded body and the metallic material and during sliding between liquid crystal polymer molded bodies are difficult to sufficiently lower.

The present invention is aimed at solving the above problem and, therefore, has an object of providing a liquid crystal polymer composition having a low coefficient of static friction and a low coefficient of kinetic friction both during sliding between a liquid crystal polymer molded body and a metallic material and during sliding between liquid crystal polymer molded bodies, a liquid crystal polymer molded body using the liquid crystal polymer composition, and a camera module using the liquid crystal polymer molded body.

Solution to Problem

The inventors conducted intensive studies to solve the above problem, thus found that when a liquid crystal polymer was used, not alone, but in combination with a polytetrafluoroethylene resin and barium sulfate, particularly significant effects were obtained, not only during sliding between a liquid crystal polymer molded body and a metallic material but also during sliding between liquid crystal polymer molded bodies, in terms of not only kinetic friction, but also static friction known to be less effective as for polytetrafluoroethylene resins, and completed the present invention. Specifically, the gist of the present invention is as follows.

Aspect 1: A liquid crystal polymer composition containing a liquid crystal polymer (A), a polytetrafluoroethylene resin (B), and barium sulfate (C).

Aspect 2: The liquid crystal polymer composition according to aspect 1, wherein the liquid crystal polymer (A) is liquid crystal polyester.

Aspect 3: The liquid crystal polymer composition according to aspect 1 or 2, wherein the polytetrafluoroethylene resin (B) has an average particle diameter of 0.1 µm to 100 µm.

Aspect 4: The liquid crystal polymer composition according to any one of aspects 1 to 3, wherein the barium sulfate (C) has an average particle diameter of 0.1 µm to 50 µm.

Aspect 5: The liquid crystal polymer composition according to any one of aspects 1 to 4, wherein a content of the polytetrafluoroethylene resin (B) is 1% by mass to 30% by mass in a total amount of 100% by mass of the liquid crystal polymer composition.

Aspect 6: The liquid crystal polymer composition according to any one of aspects 1 to 5, wherein a content of the barium sulfate (C) is 1% by mass to 30% by mass in a total amount of 100% by mass of the liquid crystal polymer composition.

Aspect 7: The liquid crystal polymer composition according to any one of aspects 1 to 6, wherein a mass ratio ((B):(C)) between the polytetrafluoroethylene resin (B) and the barium sulfate (C) is 20:80 to 80:20.

Aspect 8: The liquid crystal polymer composition according to any one of aspects 1 to 7, further containing reinforcing fibers (D).

Aspect 9: The liquid crystal polymer composition according to any one of aspects 1 to 8, being a resin composition for a camera module.

Aspect 10: A liquid crystal polymer molded body being a molded body of the liquid crystal polymer composition according to any one of aspects 1 to 9.

Aspect 11: The liquid crystal polymer molded body according to aspect 10, being a sliding member.

Aspect 12: A camera module including the liquid crystal polymer molded body according to aspect 10 or 11.

Advantageous Effects of Invention

The liquid crystal polymer composition according to the present invention enables provision of a liquid crystal polymer molded body having a low coefficient of static friction and a low coefficient of kinetic friction both during sliding between a liquid crystal polymer molded body and a metallic material and during sliding between liquid crystal polymer molded bodies.

DESCRIPTION OF EMBODIMENTS

Hereinafter, a description will be given of examples of a preferred embodiment for working of the present invention. However, the following embodiment is simply illustrative. The present invention is not at all limited by the following embodiment.

<Liquid Crystal Polymer Composition>

A liquid crystal polymer composition according to the present invention contains a liquid crystal polymer (A), a polytetrafluoroethylene resin (B), and barium sulfate (C) and may further contain, if necessary, reinforcing fibers (D), a solid lubricant, and other additives.

A description will be given below of components and so on of the liquid crystal polymer composition according to the present invention.

(Liquid Crystal Polymer (A))

The liquid crystal polymer composition according to the present invention contains a liquid crystal polymer (A) (hereinafter, referred to also as the "component (A)"). The liquid crystal polymer (A) refers to a melt-processable polymer having a property capable of forming an optically anisotropic molten phase. Optical anisotropy can be confirmed by normal ellipsometry using an orthogonal polarizer. The liquid crystal polymer (A) has an elongated molecular shape and has a flat molecular chain having high rigidity along the long chain (wherein the molecular chain is referred to as a "mesogenic group"). The mesogenic group may be contained in one or both of a polymer main chain and a polymer side chain. However, when a resultant molded body requires higher thermal resistance, the preferred liquid crystal polymer (A) is one in which the polymer main chain contains a mesogenic group.

Examples of the component (A) include liquid crystal polyester, liquid crystal polyester amide, liquid crystal polyester ether, liquid crystal polyester carbonate, liquid crystal polyester imide, and liquid crystal polyamide. Among these liquid crystal polymers, from the viewpoint of obtaining a molded body having higher strength, liquid crystal polyester, liquid crystal polyester amide or liquid crystal polyamide is preferred. From the viewpoint of obtaining lower water-absorption molded body, liquid crystal polyester or liquid crystal amide is preferred and liquid crystal polyester is more preferred. More specifically, examples include liquid crystal polymers (A1) to (A6) below. A liquid crystal polymer selected from them may be used singly or a combination of two or more of them may be used as the component (A).

Examples include liquid crystal polymers, such as:

(A1) liquid crystal polyester composed of repeating units represented by Formula (1);

(A2) liquid crystal polyester composed of repeating units represented by Formula (2) and repeating units represented by Formula (3);

(A3) liquid crystal polyester composed of repeating units represented by Formula (1), repeating units represented by Formula (2), and repeating units represented by Formula (3);

(A4) liquid crystal polyester amide or liquid crystal polyamide in which some or all of the repeating units represented by Formula (1) in (A1) are substituted with repeating units represented by Formula (4);

(A5) liquid crystal polyester amide or liquid crystal polyamide in which some or all of the repeating units represented by Formula (3) in (A2) are substituted with repeating units represented by Formula (5) and/or repeating unit represented by Formula (6); and (A6) liquid crystal polyester amide in which some or all of the repeating units represented by Formula (3) in (A3) are substituted with repeating units represented by Formula (5) and/or repeating units represented by Formula (6). A liquid crystal polymer selected from these liquid crystal polymers may be used singly or a combination of two or more of them may be used as the liquid crystal polymer (A).

[Chem. 1]

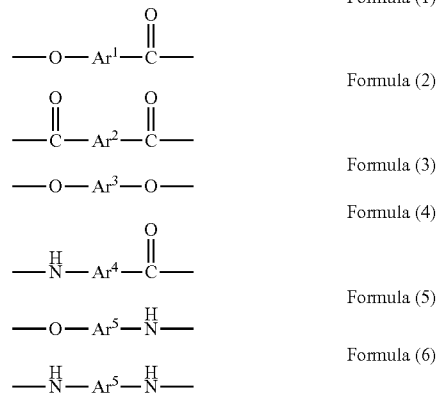

In the formulae, $Ar^1$ and $Ar^4$ each independently represent a 1,4-phenylene group, a 2,6-naphthalenediyl group or a 4,4-biphenylene group, $Ar^2$, $Ar^3$, $Ar^5$, and $Ar^6$ each independently represent a 1,4-phenylene group, a 2,6-naphthalenediyl group, a 1,3-phenylene group or a 4,4-biphenylene group, and regarding $Ar^1$, $Ar^2$, $Ar^3$, $Ar^4$, $Ar^5$, and $Ar^6$, some or all of the hydrogen atoms on the aromatic ring may be substituted with halogen atoms, alkyl groups or aryl groups.

The repeating units represented by Formula (1) are repeating units derived from an aromatic hydroxycarboxylic acid. Examples of the aromatic hydroxycarboxylic acid include 4-hydroxybenzoic acid, 3-hydroxybenzoic acid, 6-hydroxy-2-naphthoic acid, 7-hydroxy-2-naphthoic acid, 6-hydroxy-1-naphthoic acid, 4-hydroxybiphenyl-4-carboxylic acid, and aromatic hydroxycarboxylic acids in which some or all of the hydrogens on the aromatic ring in each of the above aromatic hydroxycarboxylic acids are substituted with alkyl groups, aryl groups or halogen atoms.

The repeating units represented by Formula (2) are repeating units derived from an aromatic dicarboxylic acid. Examples of the aromatic dicarboxylic acid include terephthalic acid, phthalic acid, 2,4-diphenyldicarboxylic acid, 2,6-naphthalenedicarboxylic acid, isophthalic acid, and aromatic dicarboxylic acids in which some or all of the hydrogens on the aromatic ring in each of the above aromatic dicarboxylic acids are substituted with alkyl groups, aryl groups or halogen atoms.

The repeating units represented by Formula (3) are repeating units derived from an aromatic diol. Examples of the aromatic diol include hydroquinone, resorcin, naphthalene-2,6-diol, 4,4-biphenylenediol, 3,3-biphenylenediol, 4,4-dihydroxydiphenyl ether, 4,4-dihydroxydiphenyl sulfone, and aromatic diols in which some or all of the hydrogens on the aromatic ring in each of the above aromatic diols are substituted with alkyl groups, aryl groups or halogen atoms.

The repeating units represented by Formula (4) are repeating units derived from an aromatic aminocarboxylic acid. Examples of the aromatic aminocarboxylic acid include 4-aminobenzoic acid, 3-aminobenzoic acid, 6-amino-2-naphthoic acid, and aromatic aminocarboxylic acids in which some or all of the hydrogens on the aromatic ring in each of the above aromatic aminocarboxylic acids are substituted with alkyl groups, aryl groups or halogen atoms.

The repeating units represented by Formula (5) are repeating units derived from an aromatic amine having a hydroxy group and examples include 4-aminophenol, 3-aminophenol, 4-amino-1-naphthol, 4-amino-4-hydroxydiphenyl, and aromatic hydroxyamines in which some or all of the hydrogens on the aromatic ring in each of the above aromatic amines with a hydroxy group are substituted with alkyl groups, aryl groups or halogen atoms.

The repeating units represented by Formula (6) are structural units derived from an aromatic diamine and examples include 1,4-phenylenediamine, 1,3-phenylenediamine, and aromatic diamines in which some or all of the hydrogens on the aromatic ring each of the above aromatic diamines are substituted with alkyl groups, aryl groups or halogen atoms.

Examples of the alkyl group exemplified as the substituent group included in the above structural units include linear, branched or alicyclic alkyl groups having 1 to 10 carbon atoms, including a methyl group, an ethyl group, a propyl group, an isopropyl group, a butyl group, a tert-but group, a hexyl group, a cyclohexyl group, an octyl group, and a decyl group. Examples of the aryl group include aryl groups having 6 to 10 carbon atoms, including a phenyl group and a naphthyl group. Examples of the halogen atom include a fluorine atom, chlorine atom, a bromine atom, and an iodine atom.

Among the components (A), in view of providing a molded body having higher thermal resistance and higher dimensional stability, at least one liquid crystal polyester selected from the group consisting of (A1) to (A3) is preferred and liquid crystal polyester (A1) or (A3) is particularly preferred.

The preferred component (A) is one having a melt viscosity of $5.0\times10^2$ Pa·s to $5.0\times10^3$ Pa·s measured at 300° C. and a shear rate of $1.0\times10^3$ sec$^{-1}$ with a capillary rheometer.

The shape of the component (A) is not particularly limited so long as it can be melt-kneaded. For example, any one of powdered, granular, and pelletized forms can be used.

The content of the component (A) in the liquid crystal polymer composition according to the present invention is, in a total amount of 100% by mass of the liquid crystal polymer composition, preferably 40% by mass to 98% by mass, more preferably 60% by mass to 94% by mass, and still more preferably 70% by mass to 90% by mass.

(Polytetrafluoroethylene Resin (B))

The liquid crystal polymer composition according to the present invention contains a polytetrafluoroethylene resin (B) (hereinafter, referred to also as the "component (B)"). The component (B) is a polymer having repeating units of —($CF_2$—$CF_2$)— and, for example, a modified polytetrafluoroethylene resin into which a perfluoroalkyl ether group (—$C_pF_{2p}$—O—) (where p is an integer of 1 to 4) or a polyfluoroalkyl group (H($CF_2$)$_q$) (where q is an integer of 1 to 20) is introduced can be used.

The component (B) may be obtained using the suspension polymerization method for obtaining general melding powder or the emulsion polymerization method for obtaining fine powder. Alternatively, the component (B) may be a polytetrafluoroethylene resin converted from a high-molecular-weight polytetrafluoroethylene resin to a low-molecular-weight form by thermal decomposition or radiation.

The component (B) is preferably in powdered form and its average particle diameter is preferably 0.1 μm to 100 μm, more preferably 1 μm to 50 μm, and still more preferably 5 μm to 20 μm. By defining the average particle diameter within the above range, the coefficient of friction during sliding can be further lowered. The average particle diameter of the component (B) can be measured by the laser diffraction and scattering method and is a particle diameter at a cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The particle shape of the component (B) that can be used is not particularly limited so long as the component (B) is non-fibrous particles, such as spherical, prismoidal, platy, rodlike, columnar, blocky or amorphous particles. The particle shape of the component (B) can be analyzed, for example, by observation with a scanning electron microscope (SEM).

Fibrous particles as used in the present invention refer to particles having an L/B of 3 or more and an L/T of 3 or more where the dimension of the longest side of, among cuboids (circumscribing cuboids) circumscribing the particle, a cuboid having the minimum volume is defined as a length L, the dimension of the second longest side of the cuboid is defined as a breadth B, and the dimension of the shortest side of the cuboid is defined as a thickness T (i.e. B>T). The length L and the breadth B correspond to the fiber length and the fiber diameter, respectively. The fibrous particles preferably have an L/B or 5 or more and an L/T of 5 or more. The non-fibrous particles refer to particles having an L/B of less than 3 and those of non-fibrous particles having an L/B of less than 3 and an L/T of 3 or more are referred to as platy particles.

Polytetrafluoroethylene resin (hereinafter, referred to also as "PTFE") is classified as a thermoplastic resin, but generally has an abnormally high melt viscosity and therefore cannot be injection molded. For this reason, a molded body of a resin composition containing PTFE as a major ingredient is produced by a method of compressing a mixed powder of resins and heating it to a melting point or higher to fuse the powder particles together (compression molding). PTFE for use in compression molding is high-molecular-weight one. However, if high-molecular-weight PTFE is blended and melt mixed with a general thermoplastic resin, the resin composition becomes less flowable owing to fibrillation or agglomeration of PTFE and therefore can neither be melt mixed nor injection molded. For this reason, PTFE for use as a solid lubricant for an injection-molding thermoplastic resin is low-molecular-weight PTFE. Furthermore, the liquid crystal polymer is generally melt mixed at a temperature around the melting point of PTFE and has a low viscosity during melting. Therefore, if the molecular weight of PTFE to be blended and melt mixed is too high, its particles may agglomerate.

The molecular weight and melt viscosity of PTFE are correlated with each other. Therefore, as for PTFE for use as the component (B), its MFR value measured under condition at a temperature of 372° C. and a load of 5 kg is preferably 5 g/10 min or more, more preferably 10 g/10 min or more, and still more preferably more than 35 g/10 min. The MFR value of the component (B) can be measured in conformity with JIS K 7210.

PTFE may be fired in order to suppress fibrillation and agglomeration. The melting point of a fired body thereof is 320° C. to 330° C. and the melting point of an unfired body thereof is 330° C. to 350° C., although they slightly vary depending on the molecular weight. Therefore, the firing degree can be estimated by observing the melting point. In order to further suppress agglomeration during molding, the melting point of the component (B) is preferably lower than 330° C. and its lower limit is preferably 320° C. The melting point of PTFE can be measured in conformity with JIS-K 7121.

The content of the component (B) in the liquid crystal polymer composition according to the present invention is, in a total amount of 100% by mass of the liquid crystal polymer composition, preferably 1% by mass to 30% by mass, more preferably 3% by mass to 20% by mass, and still more preferably 5% by mass to 15% mass. By defining the content of the component (B) within the range of 1% by mass to 30% by mass, the sliding properties can be further increased.

(Barium Sulfate (C))

The liquid crystal polymer composition according to the present invention contains barium sulfate (C) (hereinafter, referred to also as the "component (C)"). The component (C) is classified into: ground barium sulfate (barite powder) obtained by grinding a mineral called barite, deironing the ground product, and elutriating it; and precipitated barium sulfate obtained by artificial synthesis. Precipitated barium sulfate can be controlled in particle size depending on conditions during synthesis. Thus, desired fine barium sulfate particles having a small content of coarse particles can be produced. From the viewpoint of further reducing impurities and further homogenizing the particle size distribution of barium sulfate particle, precipitated barium sulfate is preferably used.

The component (C) is preferably in powdered form and its average particle diameter is preferably 0.1 μm to 50 μm, more preferably 0.3 μm to 30 μm, and particularly preferably 0.5 μm to 5 μm. By defining the average particle diameter within the above range, the coefficient of friction during sliding can be further decreased.

The average particle diameter of the component (C) can be measured by the laser diffraction and scattering method and is a particle diameter at a cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The particle shape of the component (C) is not particularly limited so long as the component (C) is non-fibrous particles, such as spherical, prismoidal, platy, rodlike, columnar, blocky or amorphous particles, but a spherical or amorphous shape is preferred. The particle shape of barium sulfate can be analyzed, for example, by observation with a scanning electron microscope (SEM).

Fibrous particles as used in the present invention refer to particles having an L/B of 3 or more and an L/T of 3 or more where the dimension of the longest side of, among cuboids (circumscribing cuboids) circumscribing the particle, a cuboid having the minimum volume is defined as a length L, the dimension of the second longest side of the cuboid is defined as a breadth B, and the dimension of the shortest side of the cuboid is defined as a thickness T (i.e., B>T). The length L and the breadth B correspond to the fiber length and the fiber diameter, respectively. The fibrous particles preferably have an L/B of 5 or more and an L/T of 5 or more. The non-fibrous particles refer to particles having an L/B of less than 3 and those of non-fibrous particles having an L/B of less than 3 and an L/T of 3 or more are referred to as platy particles.

The component (C) may be subjected to surface treatment. Examples of the treatment agent include a coating agent, a dispersant, and a modifier and specific examples include fatty acids, waxes, non-ionic surfactants, epoxy-based compounds, isocyanate-based compounds, silane-based compounds, titanate-based compounds, phosphorus-based compounds, aluminates, such as alumina, silicates, such as silicon dioxide, titanates, such as titanium dioxide. These treatment agents may be used singly or in combination of two or more of them.

The content of the component (C) in the liquid crystal polymer composition according to the present invention is, in a total amount of 100% by mass of the liquid crystal polymer composition, preferably 1% by mass to 30% by mass, more preferably 3% by mass to 20% by mass, and still more preferably 5% by mass to 15% by mass. By defining the content of the component (C) within the range of 1% by mass to 30% by mass, the production of particles can be further reduced.

In the liquid crystal polymer composition according to the present invention, the mass ratio ((B):(C)) between the component (B) and the component (C) is preferably 20:80 to 80:20, more preferably 30:70 to 70:30, and still more preferably 40:60 to 60:40.

By defining the mass ratio between the component (B) and the component (C) within the range of 20:80 to 80:20, the coefficient of static friction and coefficient of kinetic friction during sliding can be further lowered.

(Reinforcing Fibers (D))

The liquid crystal polymer composition according to the present invention may contain, if necessary, reinforcing fibers (D) (hereinafter, referred to also as the "component (D)") for the purpose of increasing physical properties, such as thermal resistance or mechanical strength.

The component (D) for use is not particularly limited and examples include: inorganic fibers, such as carbon fibers, glass fibers, potassium titanate fibers, wollastonite fibers, aluminum borate, magnesium borate, xonotlite, zinc oxide, basic magnesium sulfate, alumina fibers, silicon carbide fibers, boron fibers, and silicon carbide fibers; and organic fibers, such as aramid fibers and polyphenylene benzoxazole (PBO) fibers. The inorganic fibers are preferably used. These types of reinforcing fibers may be used singly or in combination of two or more of them.

The component (D) is preferably in powdered form consisting of fibrous particles. From the viewpoint of further reducing the production of particles, the average fiber length is preferably 1 µm to 300 µm, more preferably 1 µm to 200 µm, still more preferably 3 µm to 100 µm, and particularly preferably 5 µm to 50 µm. The average aspect ratio is preferably 3 to 200, more preferably 3 to 100, still more preferably 3 to 50, yet still more preferably 3 to 40, and particularly preferably 10 to 40.

Fibrous particles as used in the present invention refer to particles having an L/B of 3 or more and an L/T of 3 or more where the dimension of the longest side of, among cuboids (circumscribing cuboids) circumscribing the particle, a cuboid having the minimum volume is defined as a length L, the dimension of the second longest side of the cuboid is defined as a breadth B, and the dimension of the shortest side of the cuboid is defined as a thickness T (i.e., B>T). The length L and the breadth B correspond to the fiber length and the fiber diameter, respectively. The fibrous particles preferably have an L/B of 5 or more and an L/T of 5 or more.

The component (D) preferably has a Mohs hardness of 5 or less from the viewpoint of further increasing the sliding properties of the molded body and examples include potassium titanate fibers, wollastonite fibers, aluminum borate, magnesium borate, xonotlite, zinc oxide, and basic magnesium sulfate. From the viewpoint of further increasing the mechanical strength, the component (D) is preferably at least one of potassium titanate fibers and wollastonite fibers. The Mohs hardness is an index indicating the hardness of substances, wherein when two different minerals are rubbed against each other, scratched one of them is a substance having a lower hardness.

Heretofore known potassium titanate fibers can be widely used and examples include potassium tetratitanate fibers, potassium hexatitanate fibers, and potassium octatitanate fibers. The dimensions of potassium titanate fibers are not particularly limited so long as they are within the above-described ranges. However, their average fiber length is preferably 1 µm to 50 µm, more preferably 3 µm to 30 µm, still more preferably 3 µm to 20 µm, and particularly preferably 10 µm to 20 µm, their average fiber diameter is preferably 0.01 µm to 1 µm, more preferably 0.05 µm to 0.8 µm, and still more preferably 0.1 µm to 0.7 µm, and their average aspect ratio is preferably 10 or more, more preferably 10 to 100, and still more preferably 15 to 35. In the present invention, even marketed products can be used and examples that can be used include "TISMO D" (average fiber length: 15 µm, average fiber diameter: 0.5 µm) and "TISMO N" (average fiber length: 15 µm, average fiber diameter: 0.5 µm) both manufactured by Otsuka Chemical Co., Ltd.

Wollastonite fibers are inorganic fibers made of calcium metasilicate. The dimensions of wollastonite fibers are not particularly limited so long as they are within the above-described ranges. However, their average fiber length is preferably 5 µm to 180 µm, more preferably 10 µm to 100 µm, and still more preferably 20 µm to 40 µm, their average fiber diameter is preferably 0.1 µm to 15 µm, more preferably 1 µm to 10 µm, and still more preferably 2 µm to 7 µm, and their average aspect ratio is preferably 3 or more, more preferably 3 to 30, still more preferably 3 to 15, and particularly preferably 5 to 15. In the present invention, even marketed products can be used and an example that can be used is "Bistal W" (average fiber length: 25 µm, average fiber diameter: 3 µm) manufactured by Otsuka Chemical Co., Ltd.

The above average fiber length and average fiber diameter can be measured by observation with a scanning electron microscope, and the average aspect ratio (average fiber length/average fiber diameter) can be calculated from the average fiber length and the average fiber diameter. For example, a plurality of reinforcing fibers are taken with a scanning electron microscope, the images of 300 reinforcing fibers are arbitrarily selected from the observed images of the plurality of reinforcing fibers, and their fiber lengths and fiber diameters are measured. The average fiber length can be determined by dividing the sum of all the measured fiber lengths by the number of fibers, and the average fiber diameter can be determined by dividing the sum of all the measured fiber diameters the number of fibers.

Regarding the component (D), in order to increase the wettability with the component (A) and further improve physical properties, such as mechanical strength, of an obtained resin composition, treated layers made of a surface treatment agent may be formed on the surfaces of reinforcing fibers for use in the present invention. The treated layer preferably covers 50% or more of the surface of the reinforcing fiber and more preferably covers 80% or more of the surface of the reinforcing fiber. However, the treated layer particularly preferably covers the entire surface of the reinforcing fiber.

Examples of the surface treatment agent include silane coupling agents, titanium coupling agents, and aluminate-based coupling agents. Preferred among them are silane coupling agents and more preferred are aminosilane coupling agents, epoxysilane coupling agents, and alkylsilane coupling agents. These surface treatment agents may be used alone or as a mixture of two or more thereof.

Examples of the aminosilane coupling agents include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-ethoxysilyl-N-(1,3-dimethylbutylidene)propylamine, N-phenyl-3-aminopropyltrimethoxysilane, and N-(vinylbenzyl)-2-aminoethyl-3-aminopropyltrimethoxysilane.

Examples of the epoxysilane coupling agents include 3-glycidyloxypropyl (dimethoxy)methylsilane, 3-glycidyloxypropyltrimethoxysilane, diethoxy(3-glycidyloxypropyl)methylsilane, triethoxy(3-glycidyloxypropyl)silane, and 2-(3,4-epoxycyclohexyl)ethyltrimethoxysilane.

Examples of the alkylsilane coupling agents include methyltrimethoxysilane, dimethyldimethoxysilane, trimethylmethoxysilane, methyltriethoxysilane, ethyltrimethoxysilane, n-propyltrimethoxysilane, isobutyltrimethoxysilane, isobutyltriethoxysilane, n-hexyltrimethoxysilane, n-hexyltriethoxysilane, cyclohexylmethyldimethoxysilane, n-octyltriethoxysilane, and n-decyltrimethoxysilane.

In relation to a method for subjecting the reinforcing fibers to surface treatment in the present invention, there are known a dry method and a wet method as a method for previously treating the surfaces or the reinforcing fibers with a coupling agent and both the methods can be used in the present invention. In doing so, the concentration of the surface treatment is suitably about 0.1% by mass to 3.0% by mass and preferably about 0.5% by mass to 1.5% by mass relative to the reinforcing fibers.

Known surface treatment methods can be used as the method for forming treated layers made of a surface treatment agent on the surfaces of the component (D) and examples include: a dry method of loading reinforcing fibers into a high-speed stirring apparatus, such as a Henschel mix, and spraying on the reinforcing fibers being stirred the surface treatment agent (in liquid form) or a solution obtained by dissolving the surface treatment agent in a solvent promoting hydrolysis (for example, water, an alcohol or a mixed solvent of them); and an integral blend method of blending the reinforcing fibers and the surface treatment agent with a resin composition.

In treating the surfaces of the reinforcing fibers for use in the present invention with the surface treatment agent, the amount of surface treatment agent is not particularly limited, but, in the dry method, the solution of the surface treatment agent may be sprayed so that the amount of surface treatment agent reaches, relative to 100 parts by mass of reinforcing fibers, for example, 0.1 parts by mass to 20 parts by mass, preferably 0.1 parts by mass to 10 parts by mass, more preferably 0.3 parts by mass to 5 parts by mass, still more preferably 0.5 parts by mass to 3 parts by mass, and most preferably 0.8 parts by mass to 1.2 parts by mass. On the other hand, in the integral blend method, the surface treatment agent may be blended with the resin composition so that the amount of surface treatment agent reaches, relative to 100 parts by mass of reinforcing fibers, preferably 1 part by mass to 50 parts by mass and more preferably 10 parts by mass to 40 parts by mass. By defining the amount of surface treatment agent within the above ranges, the adhesion of the reinforcing fibers to the component (A) can be further increased and the dispersibility of the reinforcing fibers can be further increased.

The content of the component (D) in the liquid crystal polymer composition according to the present invention is, in a total amount of 100% by mass of the liquid crystal polymer composition, preferably 0.3% by mass to 40% by mass, more preferably 0.5% by mass to 30% by mass, still more preferably 5% by mass to 25% by mass, yet still more preferably 10% by mass to 25% by mass, and particularly preferably 10% by mass to 20% by mass.

By defining the content of the component (D) within the range of 0.3% by mass to 40% by mass, the thermal resistance and mechanical strength can be further increased.

(Solid Lubricant)

The liquid crystal polymer composition according to the present invention may contain a solid lubricant other than PTFE (hereinafter, often referred to simply as the "solid lubricant") without impairing its preferred physical properties.

Examples of the solid lubricant include low-density polyethylene, linear low-density polyethylene, medium-density polyethylene, high-density polyethylene, ultra-high molecular weight polyethylene or other polyolefin resins, silicone resin, graphite, molybdenum disulfide, tungsten disulfide, and boron nitride. At least one of these solid lubricants may be blended into the liquid crystal polymer composition.

The content of the solid lubricant in the liquid crystal polymer composition according to the present invention is, in a total amount of 100% by mass of the liquid crystal polymer composition, preferably 0.5% by mass to 10% by mass and more preferably 1% by mass to 7% by mass.

(Other Additives)

The liquid crystal polymer composition according to the present invention may contain other additives without impairing its preferred physical properties. Examples of the other additives include: a non-fibrous inorganic filler (for example, calcium carbonate, mica, sericite, illite, talc, kaolinite, montmorillonite, boehmite, smectite, vermiculite, palygorskite, pyrophyllite, halloysite, diatomite, titanium dioxide, potassium titanate, sodium titanate, potassium magnesium titanate or potassium lithium titanate); a laser direct structuring additive (for example, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$ or $MgCr_2O_4$); a conductive filler (for example, metallic particles (for example, aluminum flake), metallic fibers, metal oxide particles, carbon particles (for example, graphite, expanded graphite, graphene, carbon black or graphitized carbon black), carbon nanotube, carbon fibers, ionic liquid or surfactant); an antistat (for example, anionic antistat, cationic antistat or non-ionic antistat); an antioxidant and a thermal stabilizer (for example, hindered phenol, hydroquinone, phosphite or substitutions of these substances); a ultraviolet ray absorber (for example, resorcinol, salicylate, benzotriazole, benzophenone or triazine); a light stabilizer (for example, hindered phenol); a weatherproofer; a light-resistant agent; a mold release agent (for example, higher fatty acid, higher fatty acid ester, higher fatty acid amide, metal salt of higher fatty acid (higher fatty acid used herein refers to those having 10 to 25 carbon atoms), fatty acid or metal salt of fatty acid); a lubricant; a flow modifier; a plasticizer (for example, polyester-based plasticizer, glycerin-based plasticizer, polycarboxylic acid ester-based plasticizer, phosphoric acid ester-based plasticizer, polyalkylene glycol-based plasticizer or epoxy-based plasticizer); an impact resistance improver; a flame retardant (for example, phosphazene-based compound, phosphoric acid ester, condensed phosphoric acid ester, inorganic phosphorous flame retardant, halogen-based flame retardant, silicone-based flame retardant, metal oxide-based flame retardant, metal hydroxide-based flame retardant, organometallic salt-based flame retardant, nitrogen-based flame retardant or boron compound-based flame retardant); an antidripping agent; a nucleating agent; a dispersant; a sound deadener; a neutralizer; and an antiblocking agent. The liquid crystal polymer composition may contain at least one of these additives.

In the case where the liquid crystal polymer composition according to the present invention contains the other additives, the content of them is not particularly limited unless it impairs the preferred physical properties of the liquid crystal polymer composition. The content of the other additives is, in a total amount of 100% by mass of the liquid crystal polymer composition, 10% by mass or less and preferably 5% mass or less.

<Production Method and Use of Liquid Crystal Polymer Composition>

A liquid crystal polymer composition according to the present invention contains a liquid crystal polymer (A), a polytetrafluoroethylene resin (B), and barium sulfate (C), further contains, if necessary, reinforcing fibers (D), a solid lubricant, and other additives, and can be produced by mixing and heating (particularly, melt-kneading) a mixture containing these components.

For melt-kneading, any known melt kneader, for example, a biaxial extruder, can be used. Specifically, the liquid crystal polymer composition can be produced by: (1) a method of preliminarily mixing the components with a mixer (a tumbler, a Henschel mixer or the like), melt-kneading the mixture with a melt kneader, and then pelletizing it with a pelletization device (such as a pelletizer); (2) a method of controlling a master batch of desired components, mixing it with other components as necessary, and melt-kneading the mixture into pellets with a melt kneader;

(3) a method of feeding the components into a melt kneader to form pellets; or other methods.

The processing temperature during melt kneading is not particularly limited so long as it is within a temperature range in which the liquid crystal polymer (A) can melt. Normally, the cylinder temperature of a melt kneader for use in the melt kneading is adjusted within this range.

Thus, the resin composition according to the present invention that can exhibit desired effects is produced.

The liquid crystal polymer composition according to the present invention can be produced into various types of molded bodies by a known resin molding method, such as injection molding, insert molding, compression molding, blow molding or inflation molding depending on the type, use, shape, and others of a desired molded body and is preferably produced by injection molding or insert molding. Alternatively, a molding method composed of any combination of the above molding methods may be adopted.

A liquid crystal polymer molded body obtained by molding the liquid crystal polymer composition according to the present invention has excellent slidability (a low coefficient of friction) and particularly has excellent slidability on hard metals, such as SUS304, and another liquid crystal polymer molded body (the same material). In addition, since it has a low coefficient of friction, it can be expected that the production of particles during operation of a member including the liquid crystal polymer molded body is reduced.

A liquid crystal polymer molded body molded using the liquid crystal polymer composition according to the present invention is suitably used as a material for use in producing electronic components of precision equipment. The liquid crystal polymer molded body is suitably used for production of a component including the liquid crystal polymer molded body and examples of the component include electronic components for sliding members sliding on other members, for example, components constituting one selected from the group consisting of a connector, a switch, a relay, and a camera module. The liquid crystal polymer molded body according to the present invention is used for production of, among the above electronic components, particularly electronic optical components being constituents of a camera module because it can be expected to prevent the decrease in optical properties due to fibrillation of the molded body surface. Examples of electronic optical components being constituents of a camera module include a lens barrel (a portion on which a lens is mounted), a spacer, a mount holder (a portion on which the barrel is attached and which is fixed to a substrate), a base, a lens tube, a frame of a CMOS (an image sensor), a shutter, a shutter plate, a shutter bobbin, an aperture ring, and a stopper (a portion holding a lens).

EXAMPLES

Hereinafter, a detailed description will be given of the present invention with reference to working examples and comparative examples, but the present invention is not at all limited to these examples. Specific raw materials used in the working examples and comparative examples are as follows.

Liquid crystal polymer: melt viscosity of $2.0 \times 10^3$ Pa·s, trade name "LAPEROS C950RX" manufactured by Polyplastics Co., Ltd.

Polytetrafluoroethylene resin (PTFE): average particle diameter of 8 μm, MFR value of 50 g/10 min or more, melting point of 324° C., trade name "TF 9205" manufactured by 3M Barium sulfate: average particle diameter of 1 μm, trade name "Precipitated Barium Sulfate 300" manufactured by Sakai Chemical Industry Co., Ltd.

Calcium carbonate: average particle diameter of 3 μm, trade name "SS#80" manufactured by Nitto Funka Kogyo K.K.

Potassium titanate fibers: average fiber length of 15 μm, average fiber diameter of 0.5 μm, trade name "TISMO N102" manufactured by Otsuka Chemical Co., Ltd.

Glass fibers: average fiber diameter of 7 μm, average fiber length of 3 mm, trade name "ECS 03 T-289DE" manufactured by Nippon Electric Glass Co., Ltd.

The melt viscosity of the liquid crystal polymer was measured with a melt viscosity measurement device (trade name "Capilograph 1D" manufactured by Toyo Seiki Seisaku-sho, Ltd.) using a capillary rheometer with 1.0 mm in diameter and 10 mm in length under conditions at a temperature of 300° C. and a shear rate of $1.0 \times 10^3$ sec$^{-1}$.

The MFR value of PTFE was measured under conditions at a temperature of 372° C. and a load of 5 kg for a residence time of five minutes in conformity with JIS K 7210.

The melting point of PTFE was measured with a differential calorimeter (trade name "DSC7000X" manufactured by Hitachi High-Tech Science Corporation) by putting 10 mg of sample into a measurement aluminum cell, increasing the temperature from room temperature to 50° C. at a rate of temperature increase of 10° C./min under conditions at a nitrogen flow rate of 100 ml/min, holding the temperature at 50° C. for five minutes, and then increasing the temperature to 400° C. at a rate of temperature increase of 10° C./min.

The average particle diameter was measured with a laser diffraction particle size distribution measurement device (trade name "SALD-2100" manufactured by Shimadzu Corporation).

<Example 1 to Example 2 and Comparative Example 1 to Comparative Example 4>

Materials were melt-kneaded in each composition ratio shown in Table 1 using a biaxial extruder, thus producing pellets. The cylinder temperature of the biaxial extruder was 345° C.

The obtained pellets were molded, with an injection molder, into a molded body A (with 90 mm in height, 50 mm in width, and 3 mm in thickness), a molded body B (with 3 mm in height, 10 mm in width, and 3 mm in thickness), a molded body C (with 9 mm in height, 9 mm in width, and 1 mm in thickness), and a JIS test piece, thus obtaining evaluation samples. The cylinder temperature of the injection molder was 320° C. and the mold temperature thereof was 120° C.

<Evaluations>

(Coefficient of Friction)

The evaluation sample was measured in terms of coefficient of static friction (μs) and coefficient of kinetic friction (μk) at a load of 50 g and a load of 300 g with a static friction tester TRIBOSTAR TS501 (manufactured by Kyowa Interface Science Co., Ltd.) under conditions at a velocity of 0.2 mm/sec for a travel distance of 10 mm. The sliding test between the same materials (liquid crystal polymer molded bodies) was conducted in the manner of sliding the molded body A and the molded body B (sliding area: 3 mm in height by 10 mm in width). The sliding test between the evaluation sample and the hard metal was conducted in the manner of sliding the molded body A and a stainless steel ball (SUS304 with a diameter of 3 mm). The results are shown in Table 1.

TABLE 1

|  |  |  |  | Ex. 1 | Ex. 2 | Comp. Ex. 1 | Comp. Ex. 2 | Comp. Ex. 3 | Comp. Ex. 4 |
|---|---|---|---|---|---|---|---|---|---|
| Composition (parts by mass) |  | liquid crystal polymer |  | 65 | 65 | 65 | 75 | 75 | 75 |
|  |  | PTFE |  | 10 | 10 | 10 | 10 |  |  |
|  |  | barium sulfate |  | 10 | 10 |  |  | 10 |  |
|  |  | calcium carbonate |  |  |  | 10 |  |  | 10 |
|  |  | potassium titanate fibers |  | 15 |  | 15 | 15 | 15 | 15 |
|  |  | glass fibers |  |  | 15 |  |  |  |  |
| Evaluations | Coefficient of Static Friction ($\mu s$) | Load 50 g | Counter material: Same material | 0.128 | 0.134 | 0.149 | 0.169 | 0.171 | 0.152 |
|  |  |  | Counter material: SUS | 0.098 | 0.102 | 0.125 | 0.113 | 0.113 | 0.159 |
|  |  | Load 300 g | Counter material: Same material | 0.105 | 0.113 | 0.151 | 0.135 | 0.132 | 0.151 |
|  |  |  | Counter material: SUS | 0.080 | 0.084 | 0.085 | 0.086 | 0.100 | 0.137 |
|  | Coefficient of Kinetic Friction ($\mu k$) | Load 50 g | Counter material: Same material | 0.096 | 0.108 | 0.113 | 0.117 | 0.103 | 0.120 |
|  |  |  | Counter material: SUS | 0.070 | 0.074 | 0.093 | 0.083 | 0.094 | 0.113 |
|  |  | Load 300 g | Counter material: Same material | 0.076 | 0.078 | 0.086 | 0.101 | 0.090 | 0.120 |
|  |  |  | Counter material: SUS | 0.067 | 0.060 | 0.074 | 0.072 | 0.087 | 0.114 |

As is obvious from Table 1, it can be seen that, in Examples 1 and 2 each containing all of the liquid crystal polymer, polytetrafluoroethylene resin, and barium sulfate, the coefficient of static friction and the coefficient of kinetic friction were lowered in both the cases of sliding between the liquid crystal polymer molded body and the metallic material and sliding between the liquid crystal polymer molded bodies. In contrast, it can be seen that, in Comparative Examples 1 to 4 not containing at least one of the polytetrafluoroethylene resin and barium sulfate, the coefficient of static friction and the coefficient of kinetic friction could not sufficient be lowered in both the cases of sliding between the liquid crystal polymer molded body and the metallic material and sliding between the liquid crystal polymer molded bodies. Furthermore, it can be seen that, in Examples 1 and 2, the coefficient of static friction could significantly be lowered as compared with Comparative Examples 1 to 4.

Comparative Example 2 contains the liquid crystal polymer and the polytetrafluoroethylene resin. Comparative Example 3 contains the liquid crystal polymer and barium sulfate. In other words, Comparative Examples 2 and 3 contain, in addition to the liquid crystal polymer, one of the polytetrafluoroethylene resin and barium sulfate. However, the coefficient of static friction and the coefficient of kinetic friction could not sufficiently be lowered in both the cases of sliding between the liquid crystal polymer molded body and the metallic material and sliding between the liquid crystal polymer molded bodies.

Unlike the above, Example 1 contains, in addition to the liquid crystal polymer, both of the polytetrafluoroethylene resin and barium sulfate and, thus, the coefficient of static friction and the coefficient of kinetic friction could sufficiently be lowered in both the cases of sliding between the liquid crystal polymer molded body and the metallic material and sliding between the liquid crystal polymer molded bodies. This shows that when a liquid crystal polymer composition contains, in addition to the liquid crystal polymer, both of the polytetrafluoroethylene resin and barium sulfate, an unexpected effect that would not be obtained when it contains, in addition to the liquid crystal polymer, one of the polytetrafluoroethylene resin and barium sulfate can be obtained.

(Amount of Dust Produced)

Twenty molded bodies C were measured in terms of weight and then loaded into a container (made of SUS) having a width of 50 mm and the container was placed in a vibrator and vibrated therein at 60 Hz for five minutes. After the end of the vibration, the twenty molded bodies C were picked up from the container and measured in terms of weight. The difference in weight of the molded bodies between before and after the vibration test was calculated as an amount of dust produced. The results are shown in Table 2.

(Bending Strength and Bending Modulus of Elasticity)

The samples were subjected to a 60 mm-span three-point bending test with a tester Autograph AG-5000 (manufactured by Shimadzu Corporation) in conformity with JIS K 7271 to measure their bending strengths and bending moduli of elasticity. The results are shown in Table 2.

(Notched IZOD Impact Value)

The No. 1 test pieces as the evaluation samples were measured in conformity with JIS K 7110. The results are shown in Table 2.

TABLE 2

|  |  |  | Ex. 1 | Ex. 2 | Comp. Ex. 1 |
|---|---|---|---|---|---|
| Evaluations | Amount of Dust Produced | Weight Reduction Rate % | 0.60 | 0.78 | 0.70 |
|  | Bending Strength (MPa) |  | 164 | 163 | 161 |
|  | Bending Modulus of Elasticity (GPa) |  | 9.3 | 9.4 | 9.5 |
|  | IZOD (J/m) |  | 30 | 41 | 28 |

It can be seen from Table 2 that the molded bodies obtained in Examples 1 and 2 exhibited good results in terms of amount of dust produced, bending strength, bending modulus of elasticity, and impact resistance. Therefore, the molded body of the liquid crystal polymer composition according to the present invention can be suitably used in, for example, electronic optical components being constituents of a camera module.

The invention claimed is:

1. A liquid crystal polymer composition containing a liquid crystal polymer (A), a polytetrafluoroethylene resin (B), and barium sulfate (C), wherein a mass ratio ((B):(C)) between the polytetrafluoroethylene resin (B) and the barium sulfate (C) is 40:60 to 60:40.

2. The liquid crystal polymer composition according to claim 1, wherein the liquid crystal polymer (A) is liquid crystal polyester.

3. The liquid crystal polymer composition according to claim 1, wherein the polytetrafluoroethylene resin (B) has an average particle diameter of 0.1 μm to 100 μm.

4. The liquid crystal polymer composition according to claim 1, wherein the barium sulfate (C) has an average particle diameter of 0.1 μm to 50 μm.

5. The liquid crystal polymer composition according to claim 1, wherein a content of the polytetrafluoroethylene resin (B) is 1% by mass to 30% by mass in a total amount of 100% by mass of the liquid crystal polymer composition.

6. The liquid crystal polymer composition according to claim 1, wherein a content of the barium sulfate (C) is 1% by mass to 30% by mass in a total amount of 100% by mass of the liquid crystal polymer composition.

7. The liquid crystal polymer composition according to claim 1, further containing reinforcing fibers (D).

8. The liquid crystal polymer composition according to claim 1, being a resin composition for a camera module.

9. A liquid crystal polymer molded body being a molded body of the liquid crystal polymer composition according to claim 1.

10. The liquid crystal polymer molded body according to claim 9, being a sliding member.

11. A camera module comprising the liquid crystal polymer molded body according to claim 9.

\* \* \* \* \*